United States Patent
Rufo, Jr. et al.

(10) Patent No.: US 6,523,685 B1
(45) Date of Patent: *Feb. 25, 2003

(54) ROSETTE WITH RELEASE TAB FOR HOLDING DISC SHAPED ELEMENTS

(75) Inventors: George Francis Rufo, Jr., Dalton, MA (US); David Louis Bolognia, Lanesboro, MA (US); Daniel Edward Cornwell, Pittsfield, MA (US)

(73) Assignee: Westvaco Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,095

(22) Filed: Sep. 7, 2000

Related U.S. Application Data

(63) Continuation-in-part of application No. 09/391,525, filed on Sep. 8, 1999, now Pat. No. 6,123,192.

(51) Int. Cl.[7] .............................................. B65D 85/57
(52) U.S. Cl. ................................... 206/310; 206/308.1
(58) Field of Search .......................... 206/309, 308.1, 206/310, 312, 493

(56) References Cited

U.S. PATENT DOCUMENTS

| | | | | |
|---|---|---|---|---|
| 5,651,458 A | * | 7/1997 | Brosmith et al. | 206/308.1 |
| 5,829,582 A | * | 11/1998 | Ippolito et al. | 206/308.1 |
| 6,085,900 A | * | 7/2000 | Wong | 206/310 |
| 6,123,192 A | * | 9/2000 | Rufo, Jr. | 206/310 |
| 6,196,384 B1 | * | 3/2001 | Belden, Jr. | 206/310 |

* cited by examiner

Primary Examiner—David T. Fidei
(74) Attorney, Agent, or Firm—Nixon Peabody LLP; Stuart J. Friedman

(57) ABSTRACT

An improved rosette for securing a disc having a central aperture includes a raised cylindrical hub projecting upward from a planar base, the hub being formed of first and second upstanding annular sections having substantially cylindrical side walls, the first annular section comprising at least 180° of the circumferential extent of the circular hub. Each of the annular sections includes at least one radially extending rim projecting outwardly beyond the cylindrical side walls. An arm cantilevered from the cylindrical wall of the second annular section above the base extends radially inwardly toward the central axis of the hub such that downward finger pressure applied to the free end of the arm causes the cylindrical wall of the second annular section to pivot radially inwardly and downwardly to allow the central aperture of a disc mounted on the rosette to be released from engagement with the radially extending rims for one-handed removal of the disc from the rosette.

32 Claims, 9 Drawing Sheets

ROSETTE WITH RELEASE TAB FOR HOLDING DISC SHAPED ELEMENTS

CROSS-REFERENCE TO RELATED APPLICATIONS

This is a continuation-in-part application of Ser. No 09/391,525, filed Sep. 8, 1999 now U.S. Pat. No. 6,123,192.

BACKGROUND OF THE INVENTION

1. Field of the Invention

The present invention relates generally to enclosures for receiving and storing digitally coded discs and, more particularly, to an improved disc retaining means for holding such discs within such enclosures.

2. Description of the Prior Art

Various types of planar discs are in use at the present time to record and store information which is to be retrieved by various means, such as by optical or magnetic means. Typical of such discs are compact discs (CDs) in which information is digitally recorded by use of a laser beam and then read optically by a laser beam. Such discs are used to record audio information, such as musical renditions, video information such as visual images and digital information for use as read only and other memories for use in various applications, such as computer applications. In most instances, at the present time, such discs are sold with information already recorded thereon. In other applications, such discs are sold in blank form and are used by the customer to record information thereon. In the latter case, for example, optical discs are sold for use as computer storage media and are used in hard disc storage systems. In either case, optical imperfections in or on the surfaces of such discs interfere with both the recording and retrieval of information stored on the discs. Care must, therefore, be taken in the storage, moving and handling of such discs to avoid causing any such imperfections. As used herein, the term compact disc or CD is intended to encompass all such discs, whatever their size, for all known or proposed uses.

Compact discs containing laser recorded information are typically packaged in enclosures designed to hold one or more CDs for protecting the discs during storage and shipment. Enclosures commonly used at the present time comprise a three piece assembly consisting of a base or bottom element, an insert in the base/bottom element for positioning and supporting the disc in the base/bottom element, e.g., by a center projection (commonly referred to as a "rosette") which engages the periphery of the aperture in the center of the disc, and a lid or cover which is hinged to the base/bottom element and is closed thereon after the disc is mounted therein on the tray. Other enclosures utilize only two pieces, omit the insert, and position and support the disc via the center projection directly on the base/bottom element. The enclosure is, typically, at least partially transparent and graphics relating to the disc and containing trademark and sales promotional information are usually inserted in such a manner as to be visible through the enclosure. In another form of CD packaging, a tray having a rosette projecting from the base thereof for receiving and supporting the CD is attached to a paperboard component which folds over the tray to enclose the CD.

It has become conventional for at least the CD receiving and supporting element of the CD enclosures to be formed by injection molding. As a consequence the rosettes are formed of the same plastic material as the base or tray with which they are integrally molded. The base and/or tray elements and, therefore, the rosettes have typically been made from pigmented thermoplastic molding resins having sufficient impact resistance to withstand the forces attendant to mounting and unmounting CDs as well as the forces experienced during shipping and handling.

Most typically, the rosette comprises a raised hub which is formed integrally with the base/bottom element or tray, preferably by injection molding. The hub includes a plurality of small gripping teeth or fingers for radially engaging the central aperture in the CD. Generally, to mount a CD onto the rosette, the central aperture of the CD is positioned over the rosette and a slight downward pressure is applied. Due to the relative dimensions of the central aperture and the rosette, the downward pressure causes the gripping teeth or fingers to deflect radially inwardly and to resiliently engage the central aperture of the CD. In this way the rosette engages and secures the CD in place during storage. To remove a CD from the rosette, the top center of the rosette is pressed down with one finger to disengage the teeth or fingers while the periphery of the CD is simultaneously lifted. One of the problems with many currently available enclosures is that, because it is difficult to continuously push on the top center of the rosette while lifting, frequently, release pressure on the top of the rosette is not maintained while lifting pressure on the periphery is increased. The result is that the disc is forced off of the rosette, causing the CD to bent or broken and the rosette to be damaged.

There have been many attempts to make disc removal easier and less damaging. For example, U.S. Pat. No. 4,793,479—Otsuka et al discloses dis-engagement structure in which the rosette is provided with a central pushing part having cranked flap pieces arranged such that pressing down on the pushing part causes the cranked flap pieces to push the disc off the disc-engagement structure. U.S. Pat. No. 5,251,750—Gelardi et al teaches a rosette having upwardly extending engagement arms for engaging the center hole of a disc at their upper ends and which extend radially inwardly for connection with a center button, the engagement arms having integrally molded upwardly extending ejection arms at their lower end for engaging the underside of the disc. When the center button is depressed the upwardly extending ejection arms push upwardly on the underside of the disc to release its engagement with the upper end of the engagement arms. U.S. Pat. No. 5,788,068—Fraser et al discloses a central disk retaining member comprising two resilient inwardly extending radial arms cantilevered from the base portion and interconnected at their inner ends to provide a central button-like member, the arms being formed with disk-retaining overhanging lips to retain the disk on the member. To release a disk from engagement with the member, the central button is depressed, causing the arms to rotate downwardly and inwardly, to allow the disk to be lifted over the overhanging lips.

However, efforts to date directed at solving the disc removal problem suffer from one or more shortcomings which make the resulting rosette either unsatisfactory or not particularly desirable for use in a CD enclosure. This is because prior art rosettes are, typically, either of complex construction and, therefore, uneconomical to manufacture or unacceptably fragile and unreliable in use, which presents substantial risk of damaging the information bearing surface of the disc. Accordingly, there remains a need for a simple, inexpensive to manufacture and easy to use rosette for a CD enclosure which is configured to facilitate safe mounting and unmounting of the disc thereon and which does not present a damage risk for the disc's information bearing surface.

SUMMARY OF THE INVENTION

It is therefore a primary object of the present invention to provide a rosette for a CD enclosure which permits its manufacture by injection molding, which is configured to facilitate safe mounting and unmounting of the disc thereon and which does not present a damage risk for the disc's information bearing surface.

It is also an object of the present invention to provide an improved rosette for a CD enclosure which is simple, inexpensive to manufacture and easy to use.

It is another object of the present invention to provide a rosette for a CD enclosure which securely holds a CD in place thereon but which enables easy one-handed removal of the CD therefrom.

It is still another object of the present invention to provide a rosette for a CD enclosure formed in two partially cylindrical sections which together define a generally cylindrical upstanding rosette, one of the sections being resiliently mounted on the base to permit inward pivotal movement of its cylindrical wall along a radially directed arc in response to downward finger pressure on a radially inwardly extending tab cantilevered from the cylindrical wall, whereby a disc mounted on the rosette may be one-handedly removed therefrom.

It is yet another object of the present invention to provide a rosette which includes resilient ejection means arranged to support a disc above the base when the disc is mounted on the rosette and to urge the disc off of the rosette when the disc is released from engagement therewith.

The foregoing and other objects are achieved in accordance with the present invention by providing disc retaining means for securing at least one disc shaped element having a central aperture, the disc retaining means comprising: a) a raised circular hub having a substantially cylindrical side wall, the hub projecting upward from a planar base and having a central axis extending generally parallel to the cylindrical side wall; b) the hub comprising first and second upstanding annular sections, the first annular section comprising at least 180° of the circumferential extent of the circular hub and the second annular section comprising substantially the remainder of the 360° circumferential extent of the hub; c) each of the annular sections including at least one radially extending rim projecting outwardly beyond the outside diameter of the annular section cylindrical side walls; d) means for supporting the second annular section on the base to allow the second annular section to pivot radially inwardly and downwardly and to resiliently return to its unpivoted position; f) tab means cantilevered from the second annular section above the base, the tab means extending radially inwardly toward the central axis; g) wherein a disc shaped element mounted on the disc retaining member may be one-handedly removed therefrom by the application of finger pressure to the tab means in a direction causing the free end of the tab means to move downwardly toward the base, the movement of the tab means causing the cylindrical wall of the second annular section to pivot radially inwardly and downwardly, allowing the disc central aperture to slide upwardly over the radially extending rims, whereby the disc shaped element raises up off of the hub as it is released from engagement with the radially extending rims.

In a first embodiment of the invention, the substantially cylindrical hub sidewall is defined by first and second substantially cylindrical side walls and the second annular section is radially offset away from the central axis such that the cylindrical wall of the second annular section is positioned radially outwardly of the cylindrical wall of the first annular section. A second embodiment of the invention is designed to be even more resistant to impact and jarring and, therefore, less fragile and subject to breakage, and includes means for reducing the likelihood that one removing a CD from the rosette will do so in a manner which is likely to damage the CD. In the second embodiment, the first annular section includes a first substantially cylindrical side wall having a reduced vertical height along portions thereof between the second annular section and the radially extending rims of the first annular section, and the means for supporting the second annular section on the base comprises spaced legs extending between the base and the tab means for supporting the tab means. In addition, trays including the rosettes of the present invention desirably include fingerwells positioned along the circumferential perimetric outer edge of the CD and, specifically, along the arc length thereof which is rearward of the tab means.

Desirably, the disc retaining means further includes resilient ejection means arranged to support the disc shaped element above the base when the element is mounted on the disc retaining member and to urge the disc shaped element off of the disc retaining member when the element is released from its engagement with the radially extending rims. Preferably, the resilient ejection means comprises a plurality of resilient arms cantilevered from the base and extending into contact with the underside of the disc shaped element when the element is mounted on the disc retaining member.

DESCRIPTION OF THE PREFERRED EMBODIMENT

Figure 1:
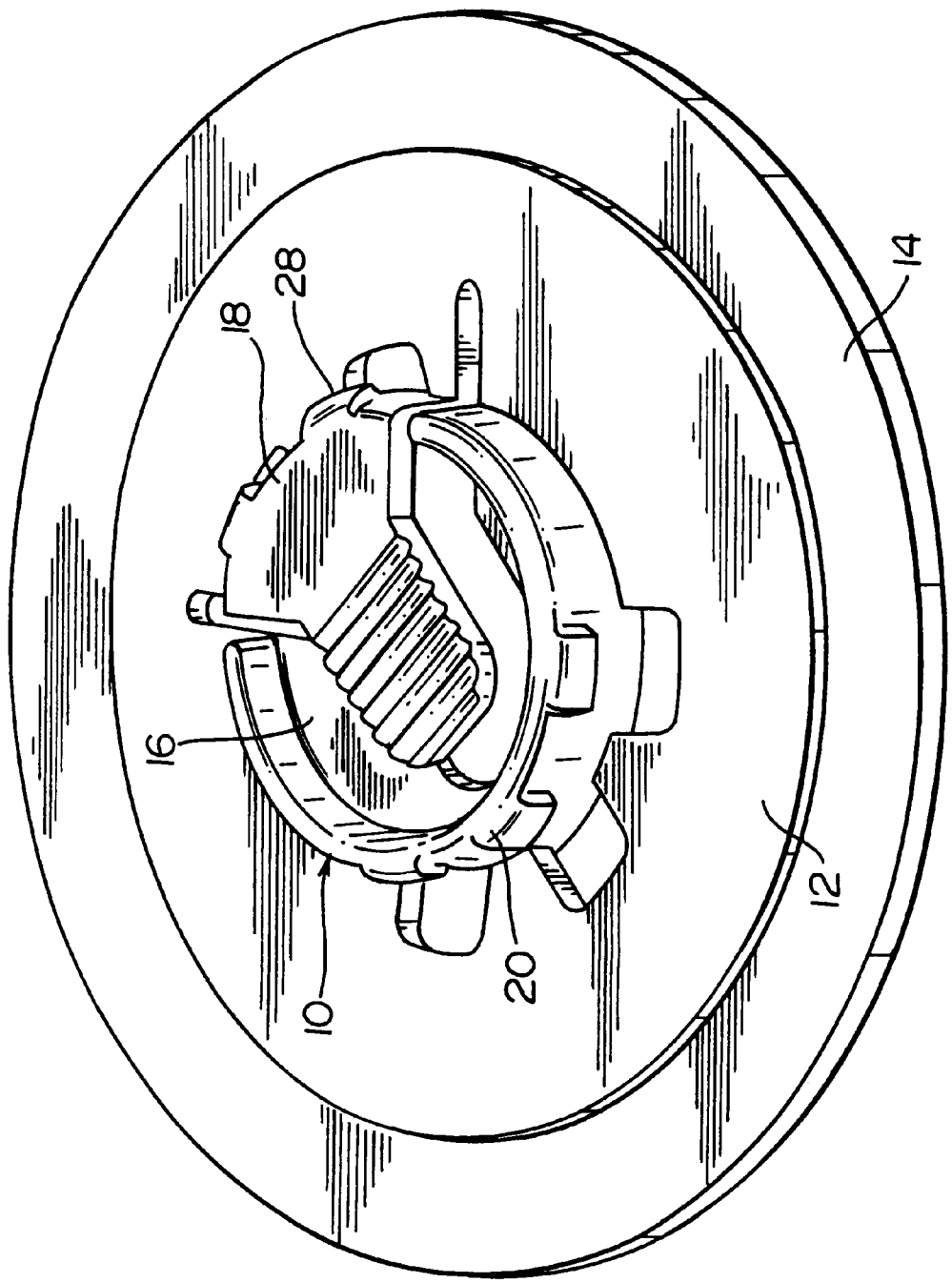
FIG. 1 is a perspective view of one embodiment of the improved rosette of the present invention.

A first preferred embodiment of the present invention is illustrated in FIGS. 1, 2, 3 and 4 in which there is illustrated an improved rosette or mounting hub 10 for a CD enclosure. Rosette 10 is generally positioned in the same location within CD enclosures as prior art rosettes, i.e., generally centrally located on the insert of three piece enclosures or on the base of two piece plastic and paperboard enclosures. Desirably, rosette 10 is molded integrally with the base or tray of the enclosure. In the embodiment of FIGS. 1–4, rosette 10 is molded on raised CD seat 12 which, itself, is molded on tray or base 14. Raised seat 12 provides a circular surface on which the annular area of the CD which is immediately adjacent the central disc aperture can be supported above the base 14. This area of the CD typically contains no recorded information and, therefore, contact between the CD in this area and the raised seat will not damage the CD. The CD may optionally be peripherally supported at its outer edges (not shown) which also, typically, contains no recorded information in order to provide further assurance that contact of the recorded areas of the CD with either the base or tray or the cover of the CD enclosure will be avoided. Extending upward from disc seat 12 is rosette 10 which is essentially a vertical cylindrical section comprising first and second upstanding annular sections 16, 18, respectively, which together define the generally cylindrical rosette 10.

First annular section 16, substantially rigidly supported from base 14, includes at least one, preferably two or more (three are shown), circumferentially spaced, radially outwardly projecting rim sections 20 along its upper edge. First annular section 16 comprises more than 180° of the circumferential extent of the cylindrical rosette. Preferably, the circumferential extent of the first annular section 16 is from 270° to 315°, although it will be appreciated that the selected extent will vary depending upon such factors as size of the rosette, material from which the rosette is molded, and the like. Second annular section 18, which is also supported from base 14, albeit less rigidly than section 16, comprises the remainder of the approximately 360° circumferential extent of the rosette cylinder. Second annular section 18 is radially offset away from the axis 26 of the cylindrical rosette so that section 18 extends radially outwardly of the first annular section 16. Like section 16, second annular section 18 includes at least one, preferably two or more (two are shown), circumferentially spaced, radially outwardly projecting rim sections 28 along its upper edge. A plurality of apertures 24 are formed in raised seat 12 underlying the respective rim sections 20, 28 to allow the rim sections to be formed during a one-shot molding operation.

Figure 2:
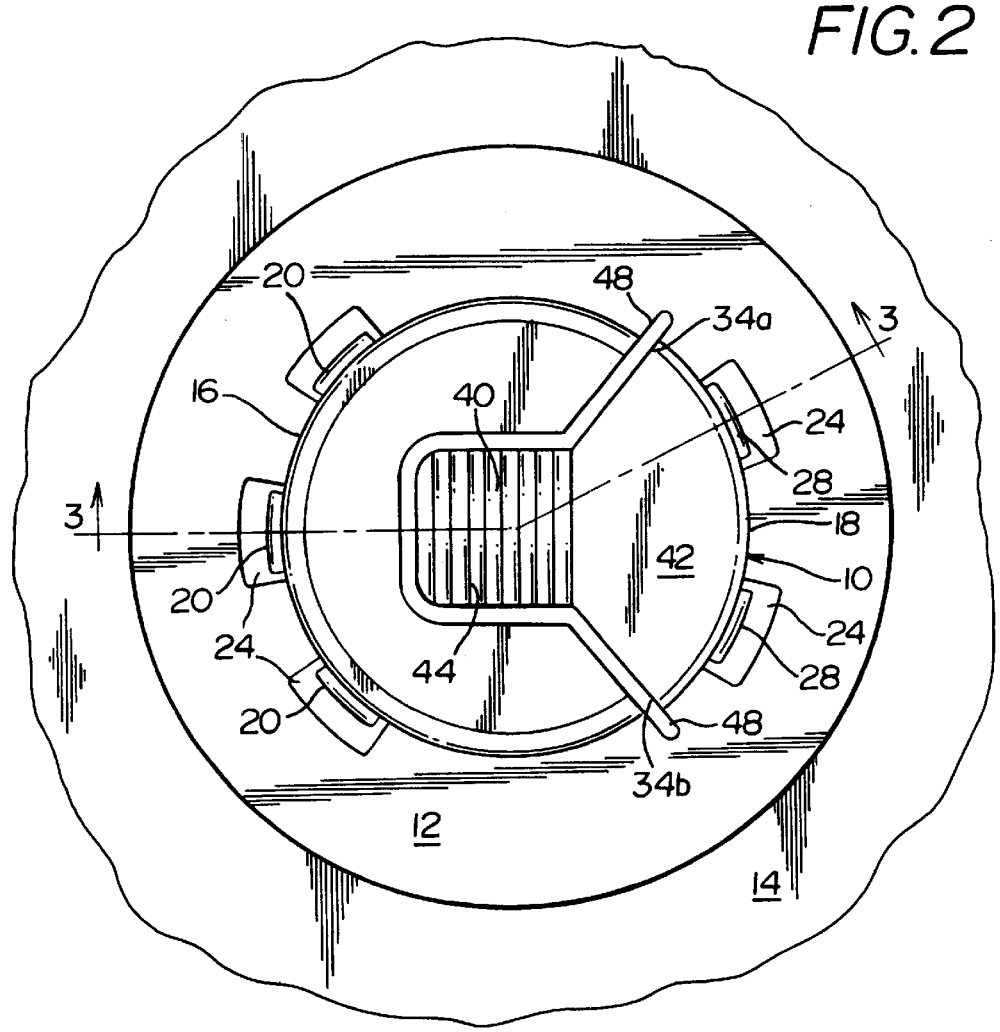
FIG. 2 is a plan view of the improved rosette of FIG. 1.
Figure 3:
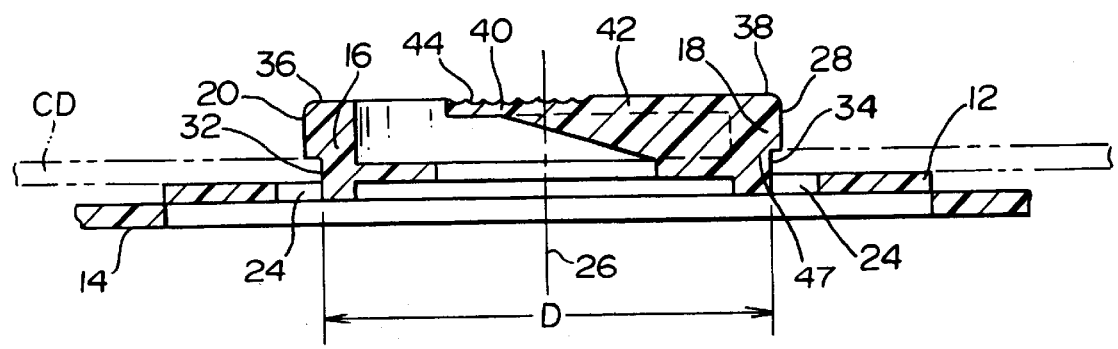
FIG. 3 is a sectional view taken along line 3—3 of FIG. 2.

Each annular section 16, 18 includes at least one rim section 20, 28 which projects radially outwardly beyond the outer diameter of the outer vertical cylindrical walls 32, 34 of each section 16, 18 of rosette 10 and extends circumferentially along walls 32, 34. As can be seen in FIGS. 1 and 2, each of the rim sections desirably extends circumferentially only a short distance along vertical walls 32, 34 although they may extend a greater distance, up to the entire circumferential length of each annular section 16, 18, if desired. With reference to FIG. 3 it will be seen that rim sections 20, 28 extends outwardly and downwardly from the merge point between annular section vertical walls 32, 34 and annular section top walls 36, 38 and continue downwardly along vertical walls 32, 34 to a point intermediate the length of walls 32, 34 where the rim sections 20, 28 extend inwardly to merge with the vertical walls. The radially outer edges of top walls 36, 38 are chamfered or rounded to provide a guide curvature which allows the CD to slip easily over rosette 10.

The outer diameter D of rosette 10 measured between vertical walls 32, 34 is slightly larger than the diameter of the disc central aperture. Rim sections 20, 28 extend radially outwardly from the vertical walls 32, 34 which makes the outer diameter at the rim sections even larger than the outer diameter of the rosette 10 at the vertical walls 32, 34. In order to mount a disc, the disc central aperture is centered over rosette 10 and the CD is pressed vertically downward such that the perimetric edge of the CD central aperture contacts the chamfered or rounded upper edges of the annular sections 16, 18 causing the smaller and more resiliently mounted second annular section 18 to tilt inwardly along a radially inwardly directed arc about a fulcrum 47 defined by the area of joinder between the lower end of cylindrical wall 34 and raised seat 12. A pair of slits 48 formed in raised seat 12 and extending generally radially outwardly from adjacent the ends 34a, 34b of cylindrical wall 34 of second annular section 18 allows section 18 the freedom to pivot generally about its fulcrum 47 and to tilt inwardly and downwardly, as described. As a result, upon tilting of cylindrical wall 34, the effective maximum diameter of the rosette temporarily decreases to accommodate the somewhat smaller diameter of the disc central aperture. After the disc central aperture has passed over the rim sections 20, 28 on the annular sections 16, 18, the second annular section 18 resiliently returns toward its rest position. When the disc aperture has completely passed over rim sections 20, 28, the vertical walls 32, 34 of rosette 10 engage the perimetric edge of the disc central aperture to securely hold the disc in position. At this point, because the outer diameter defined by the vertical walls 32, 34 in their rest position is slightly larger than the diameter of the disc central aperture, the second annular section 18 cannot completely return to its rest position and the vertical walls 32, 34 are, therefore, resiliently biased against and applying a light, secure, outwardly directed pressure against the perimetric edge of the disc central aperture. When the disc (CD) is fully seated on raised seat 12, as shown in phantom in FIG. 3, it is securely held in place on rosette 10 by the radially outward directed pressure of the vertical walls 32, 34 and by the pressure of the underside of rim sections 20, 28 along the upper surface of the disc adjacent the perimetric edge of the disc central aperture.

Figure 4:
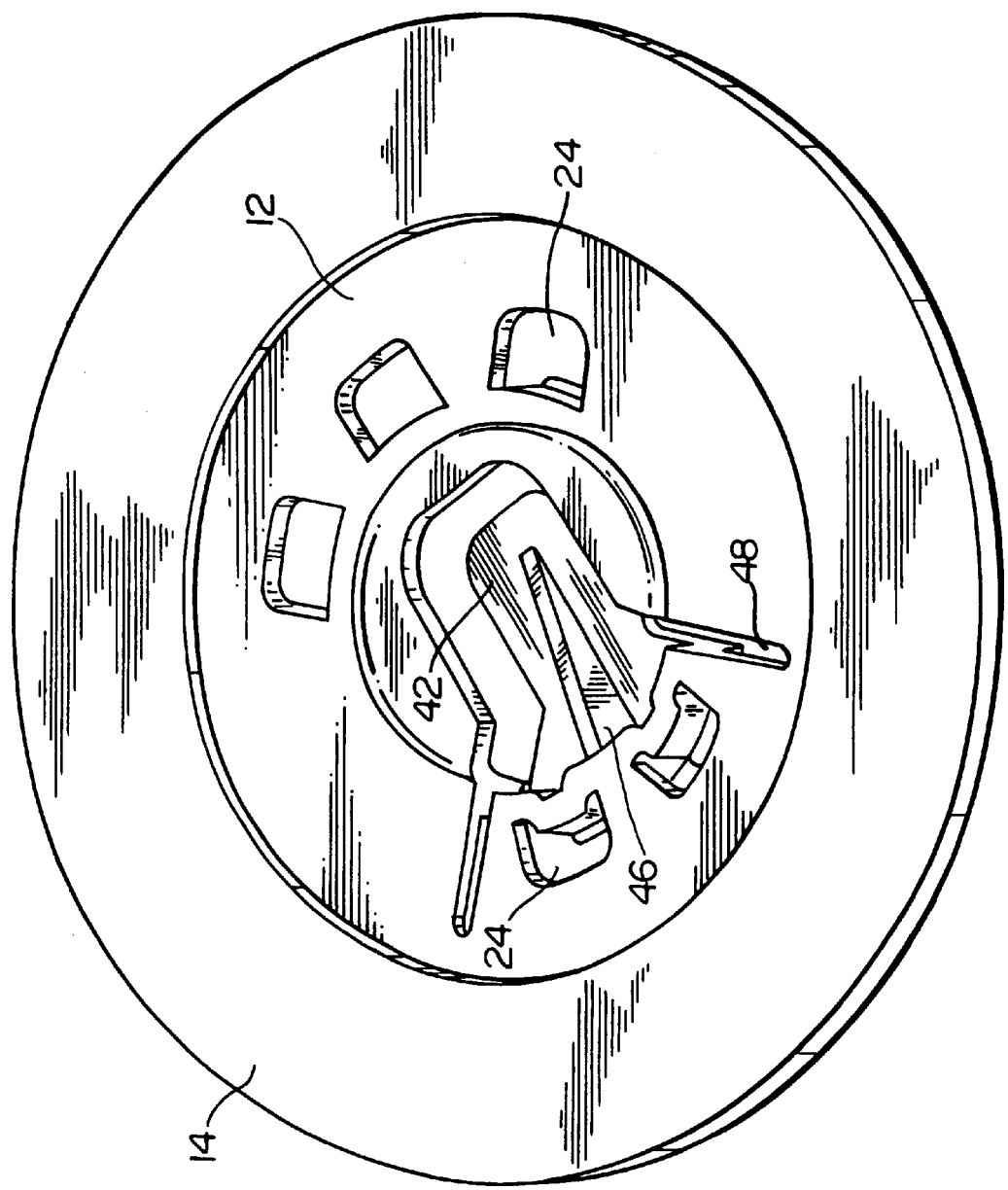
FIG. 4 is a perspective view of the underside of the improved rosette of FIG. 1.

A radially inwardly extending arm cantilevered from the cylindrical wall 34 of the second annular section 18 defines a disc release tab 42 which is operatively associated with second annular section 18 and adapted to be vertically depressed to quickly and easily release a mounted disc from its engagement on rosette 10. Removal of a disc from rosette 10 is accomplished simply by using a finger to exert a light downward pressure on the free end 40 of tab 42. Upon depressing free end 40, second annular section 18 tilts inwardly towards the axis 26 of rosette 10 and downwardly, causing rim sections 28 on the second annular section 18 to likewise move inwardly and downwardly. As a result, the effective diameter of the rosette again temporarily decreases to accommodate the somewhat smaller diameter of the disc central aperture causing the disc to slide upwardly over and past rim sections 20, 28. The free end 40 of tab 42 preferably defines, via a series of ridges 44, a pressure applying area for depressing the tab. Desirably, tab 42 has a sufficient radial length that the ridged pressure applying area thereof is centered upon or extends radially inwardly beyond the axis 26 of rosette 10. In a particularly preferred embodiment, tab 42 is supported along the entire circumferential length of second annular section 18 to allow vertically downwardly directed pressure on the free end 40 thereof to be readily translated into inwardly and downwardly directed tilting movement of second annular section 18. With reference to FIG. 4, in one embodiment of the invention, a molded rib 46 is formed on the underside of tab 42 to reinforce the tab without inhibiting the flexibility and freedom of movement of the free end 40 of tab 42.

Figure 5:
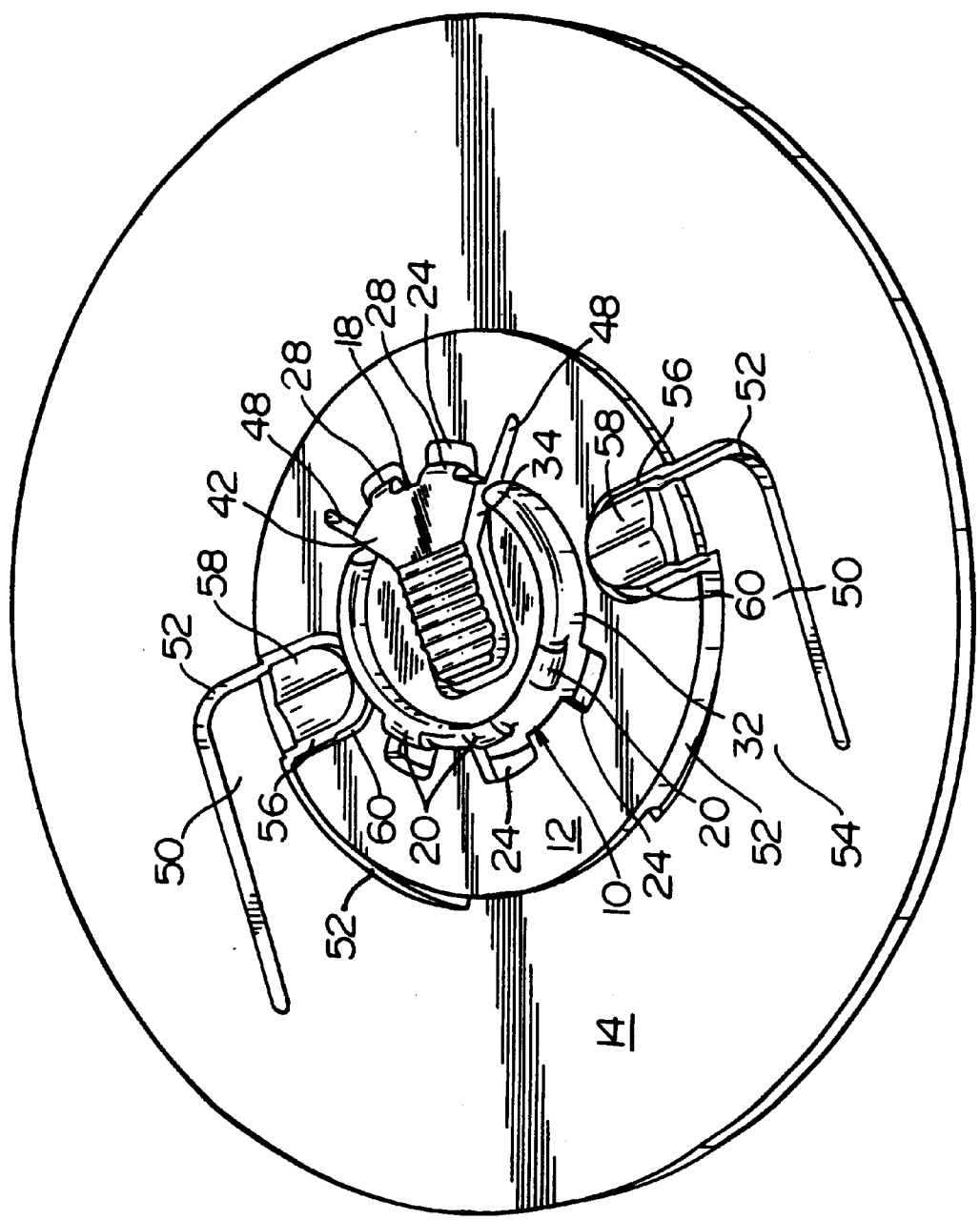
FIG. 5 is a plan view of another embodiment of the improved rosette of the present invention.

In a further embodiment of the invention, illustrated in FIG. 5, molded integrally with the rosette 10 are at least two, but permissibly more than two, consistent with the space available and the structural integrity of the base 12, resilient inwardly extending disc ejection arms 50 cantilevered from the base 14 which act to move the disk upwardly, away from base 14, when the engagement of the disk with rosette 10 is released. Disk ejection arms 50 are formed from raised seat 12 and base 14 by continuous slits 52 therein which define generally L-shaped disk ejection arms. Each disk ejection arm 50 is formed integrally with base 14 at one end 54 and is free at the other end 56. The free end has a disc contacting member 58 projecting upwardly therefrom and extending through a cut-out 60 in raised seat 12 above the height thereof such that a disc mounted upon rosette 10 contacts members 58 and resiliently depresses disc ejection arms 50 as it is pressed downwardly over rim sections 20, 28. When the disc is fully seated with the upper surface thereof in contact with the underside of the rim sections 20, 28, the disc is fully supported by the disc ejection arms 50 above raised seat 12 and disc ejection arms 50 remain resiliently depressed beneath the disc, applying a slight upward pressure to the underside thereof. In this position, the disc is, in effect, floating on the disc ejection arms and is protected from sudden shock loads during handling or transit. Upon depressing tab 42 to release the disk from its engagement with rosette 10, after second annular section 18 tilts inwardly toward the axis 26 of rosette 10 to temporarily reduce the effective diameter of rosette 10 below the diameter of the disc central aperture, the slight upward pressure exerted by disk ejection arms 50 on the underside of the disc pushes the disc upwardly off of rosette 10 as the disc is freed from the constraints of the projecting rim sections 20, 28.

Another embodiment of the improved rosette of the present invention is illustrated in FIGS. 6–9 in which there is shown an improved rosette or mounting hub 100 for a CD enclosure which is even more resistant to impact and jarring and, therefore, less fragile and subject to breakage than the rosettes described hereinbefore. Rosette 100 is generally positioned in the same location within CD enclosures as prior art rosettes. Desirably, rosette 100 is molded integrally with the base or tray of the enclosure. In the embodiment of FIGS. 6–9, rosette 100 is molded on raised CD seat 112 which, itself, is molded on tray or base 114. Raised seat 112 provides a circular surface on which the annular area of the CD which is immediately adjacent the central disc aperture can be supported above the base 114. Extending upward from disc seat 112 is rosette 100 which is essentially a vertical cylindrical section comprising first and second upstanding annular sections 116, 118, respectively, which together define the generally cylindrical rosette 100.

First annular section 116, substantially rigidly supported from base 114, includes at least one, preferably two or more, circumferentially spaced, radially outwardly projecting rim sections 120 along its upper edge. First annular section 116 comprises more than 180° of the circumferential extent of the cylindrical rosette. Preferably, the circumferential extent of the first annular section 116 is from 270° to 315°, although it will be appreciated that the selected extent will vary depending upon such factors as size of the rosette, material from which the rosette is molded, and the like. Second annular section 118, which is also supported from base 114, albeit less rigidly than section 116, comprises the remainder of the approximately 360° circumferential extent of the rosette cylinder. Like section 116, second annular section 118 includes at least one radially outwardly projecting rim section 128 along its upper edge. A plurality of apertures 124 are formed in raised seat 112 underlying the respective rim sections 120, 128 to allow the rim sections to be formed during a one-shot molding operation.

Figure 6:
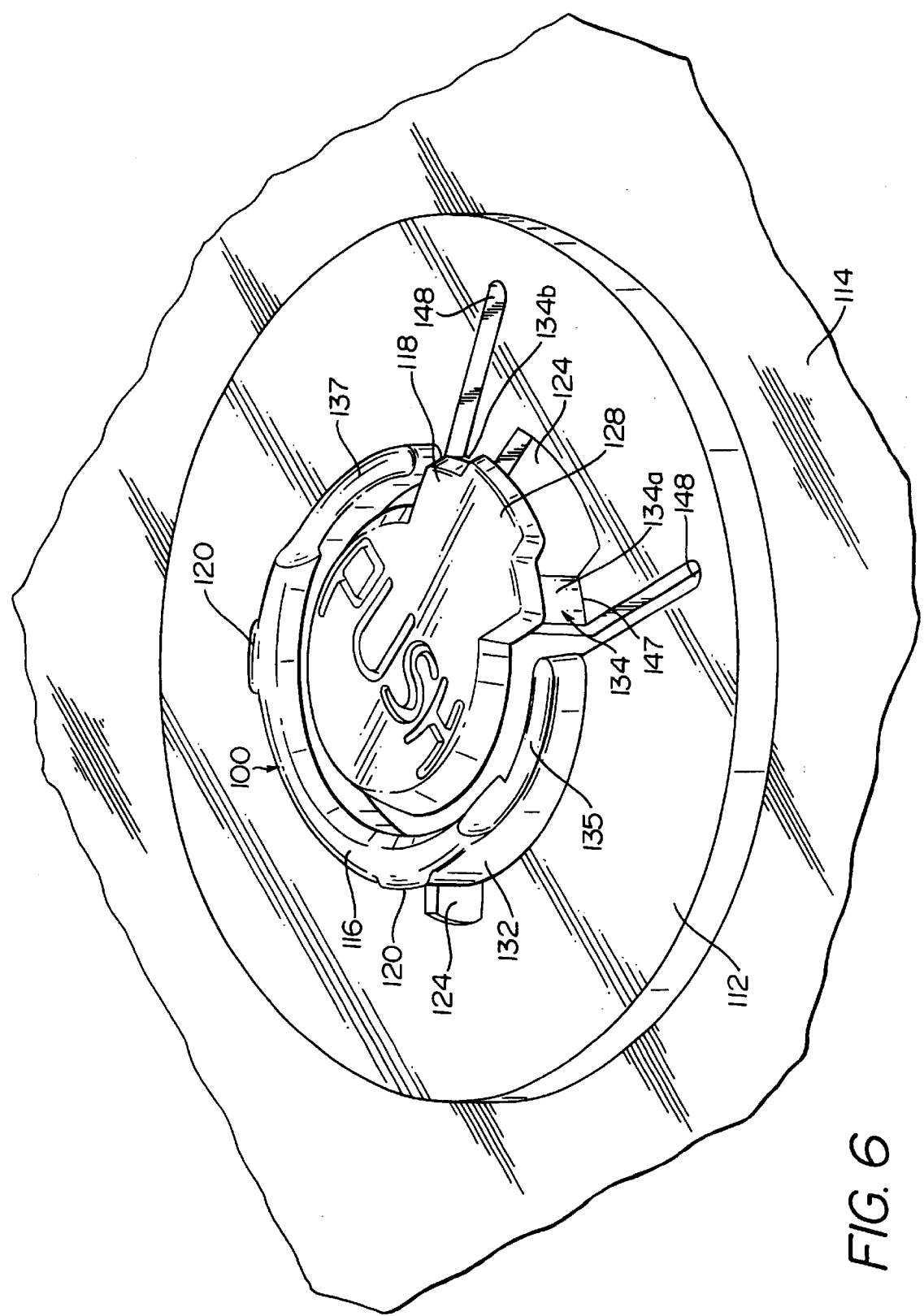
FIG. 6 is a perspective view of still another embodiment of the improved rosette of the present invention.
Figure 9:
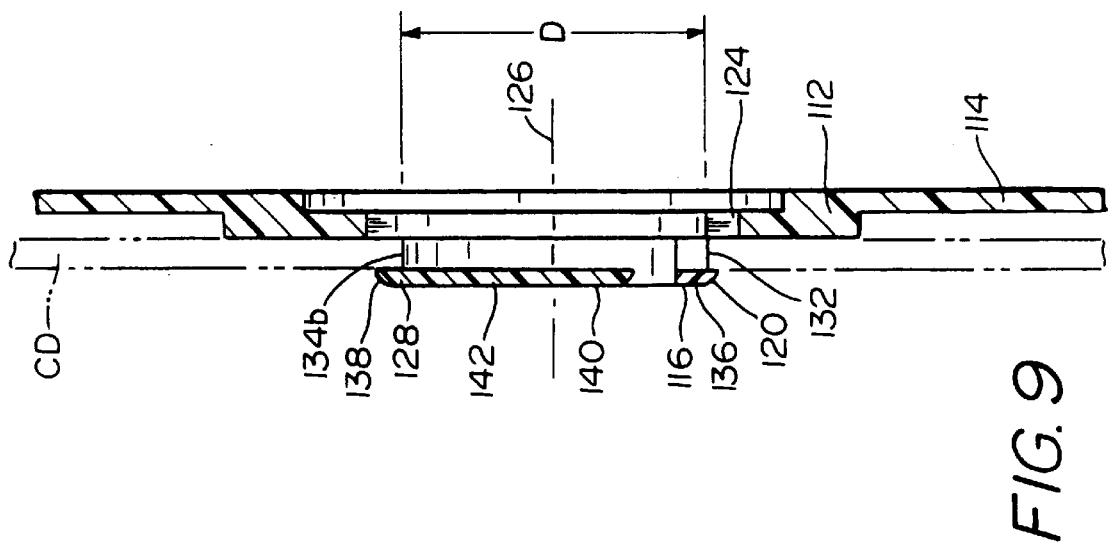
FIG. 9 is a sectional view taken along line 9—9 of FIG. 8.
Figure 8:
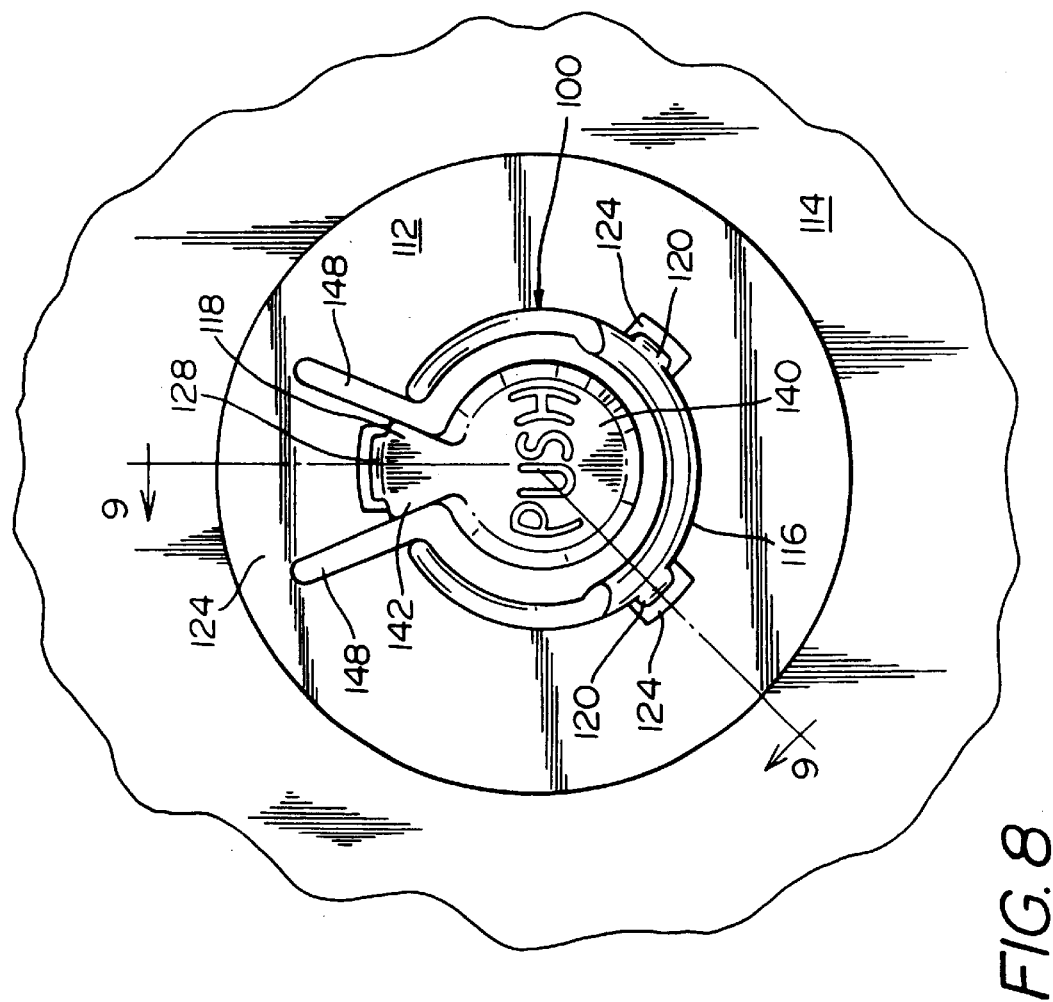
FIG. 8 is a plan view of the improved rosette of FIG. 6.

Each annular section 116, 118 includes at least one rim section 120, 128 which projects radially outwardly beyond the outer diameter of the outer vertical cylindrical wall 132 of section 116 and wall portion 134 of section 118 of rosette 100 and extends circumferentially along annular sections 116, 118. As can be seen in FIGS. 6 and 8, each of the rim sections 120 desirably extends circumferentially only a short distance along annular section 116 although it may extend a greater distance, but less than the entire circumferential length of the annular section. Rim section 128, as shown, extends the entire circumferential length of annular section 118 and projects radially outwardly beyond the outer diameter of rim section 128. With reference to FIG. 9 it will be seen that rim sections 120 extend outwardly and downwardly from the merge point between annular section vertical wall 132 and annular section top wall 136 and continue downwardly along vertical walls 132 to a point intermediate the length of wall 132 where the rim sections 120 extend inwardly to merge with the vertical wall. Rim section 128 desirably comprise the entire vertical thickness of annular section top wall 138. The radially outer edges of top walls 136, 138 are chamfered or rounded to provide a guide curvature which allows the CD to slip easily over rosette 100.

The outer diameter D of rosette 100 measured between vertical wall 132 and wall portion 134 is slightly smaller than the diameter of the disc central aperture so that the disc is able to freely rotate when mounted on rosette 100. In the preferred embodiment shown in FIGS. 6–9, wall portion 134 desirably comprises a pair of circumferentially spaced apart legs 134a, 134b extending upwardly from raised seat 112 for supporting top wall 138 of annular section 118 and disc release tab 142. Rim sections 120, 128 extend radially outwardly from the vertical wall 132 and wall portion 134 which makes the outer diameter at the rim sections larger than the outer diameter of the rosette 100 at the vertical wall 132 and wall portion 134. In order to mount a disc, the disc central aperture is centered over rosette 100 and the CD is pressed vertically downward such that the perimetric edge of the CD central aperture contacts the chamfered or rounded upper edges of the annular sections 116, 118 causing the smaller and more resiliently mounted second annular section 118 to tilt inwardly along a radially inwardly directed arc about a fulcrum 147 defined by the area of joinder between the lower end of support legs 134a, 134b and raised seat 112. A pair of slits 148 formed in raised seat 112 and extending generally radially outwardly from adjacent support legs 134a, 134b allows section 118 the freedom to pivot generally about its fulcrum 147 and to tilt inwardly and downwardly, as described. As a result, upon tilting of annular section 118, the effective maximum diameter of the rosette temporarily decreases to accommodate the somewhat smaller diameter of the disc central aperture. After the disc central aperture has passed over the rim sections 120, 128 on the annular sections 116, 118, the second annular section 118 resiliently returns toward its rest position. When the disc aperture has completely passed over rim sections 120, 128, vertical wall 132 and wall portion 134 defined by legs 134a, 134b of rosette 10 are spaced a very small distance from the perimetric edge of the disc central aperture to allow the disc to freely rotate or spin on raised seat 112 about rosette 100 yet effectively prevent significant movement of the disc toward and away from vertical wall 132 and support legs 134a, 134b. It has been found that spacing the perimetric edge of the disc central aperture from the vertical elements of rosette 100 helps to prevent rosette-breaking impact between the disc and the rosette when the tray is jarred from its side, as when the tray is dropped. When the disc (CD) is fully seated on raised seat 112, as shown in phantom in FIG. 3, it is securely held in place on rosette 100 by the pressure of the underside of rim sections 120, 128 along the upper surface of the disc adjacent the perimetric edge of the disc central aperture.

Figure 7:
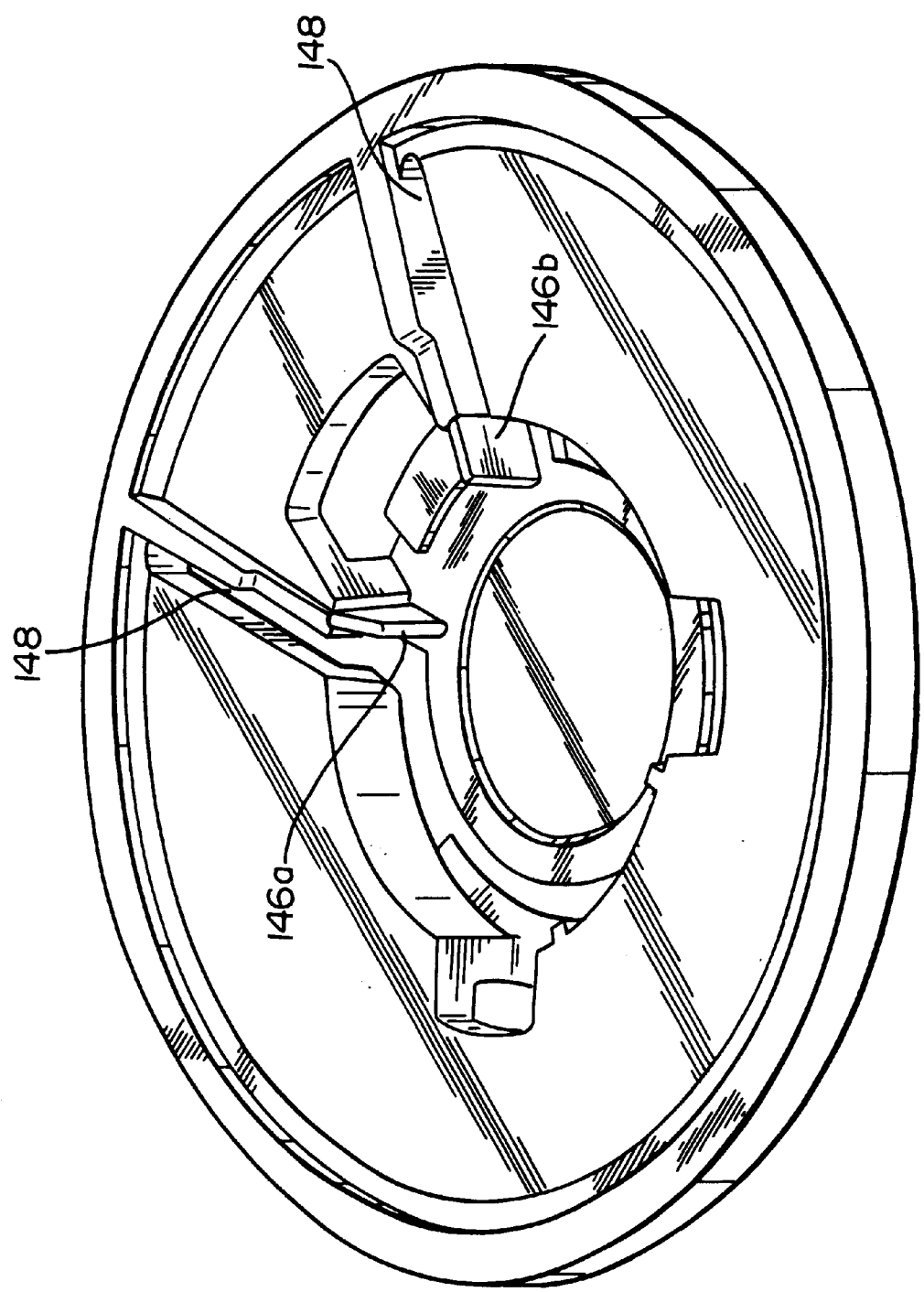
FIG. 7 is a perspective view of the underside of the improved rosette of FIG. 6.

A radially inwardly extending arm cantilevered from the second annular section 118 defines a disc release tab 142 which is operatively associated with second annular section 118 and adapted to be vertically depressed to quickly and easily release a mounted disc from its engagement on rosette 100. Removal of a disc from rosette 100 is accomplished simply by using a finger to exert a light downward pressure on the free end 140 of tab 142. Upon depressing free end 140, second annular section 118 tilts inwardly towards the axis 126 of rosette 100 and downwardly, causing rim section 128 on the second annular section 118 to likewise move inwardly and downwardly. To allow free end 140 of tab 142 to be readily depressed the end portions 135, 137 of cylindrical wall 132, i.e., the annular wall portion between slits 148 up to about rim sections 120, are substantially reduced in height, e.g., to half the height of the remainder of wall 132. The height of end portions 135, 137 should be sufficient to provide a mounting element for the central aperture of the disc but otherwise is determined primarily by the amount that the free end 140 is to be depressed. As a result of the movement of second annular section 118, the effective diameter of the rosette again temporarily decreases to accommodate the somewhat smaller diameter of the disc central aperture causing the disc to slide upwardly over and past rim sections 120, 128. The free end 140 of tab 142 preferably defines a pressure applying area (indicated, e.g., by the word PUSH molded into the upper surface of the tab) for depressing the tab. Desirably, tab 142 has a sufficient radial length that the pressure applying area thereof is centered upon or extends radially inwardly beyond the axis 126 of rosette 100. Tab 142 is supported from second annular section 118 in a manner which allows vertically downwardly directed pressure on the free end 140 thereof to be readily translated into inwardly and downwardly directed tilting movement of second annular section 118. With reference to FIG. 7, in one embodiment of the invention, a pair of spaced molded ribs 146a, 146b are formed on the underside of tab 142 to reinforce the tab without inhibiting the flexibility and freedom of movement of the free end 40 of tab 142. Preferably, ribs 146a, 146b extend substantially radially along the inner edge of slits 148.

The present invention is directed not only to the improved rosettes described herein but also to an improved insert or tray for securing and storing one or more CDs, which insert or tray is particularly useful as an element of CD enclosures. Typically, such an insert or tray comprises a substantially planar surface from which the improved rosette of the present invention projects upwardly. Desirably, the insert or tray includes a raised circular seat from which the rosette projects and on which the annular area of the CD which is immediately adjacent the central disc aperture can be supported. This area of the CD typically contains no recorded information and, therefore, contact between the CD in this area and the raised seat will not damage the CD. The insert or tray may also include a supporting raised surface for peripherally supporting the CD along its outer edges which also, typically, contain no recorded information and which will not be damaged by contact with the tray. Typically, the rosette of the present invention is positioned in the center of the insert or tray. However, if the insert or tray is substantially larger than the CD, is shaped to store other CDs or items other than CDs, or for other reasons, the rosette need not be positioned in the center of the insert or tray. CD three piece enclosures generally also include a base or bottom element in which the insert or tray may be removably secured and a lid or cover element which is hinged to the base or bottom element and is closed thereon after the disc is mounted therein on the rosette. Where the CD enclosure is of the two piece variety, the tray or insert generally comprises the base or bottom element of the enclosure to which the lid or cover is hinged.

Figure 10:
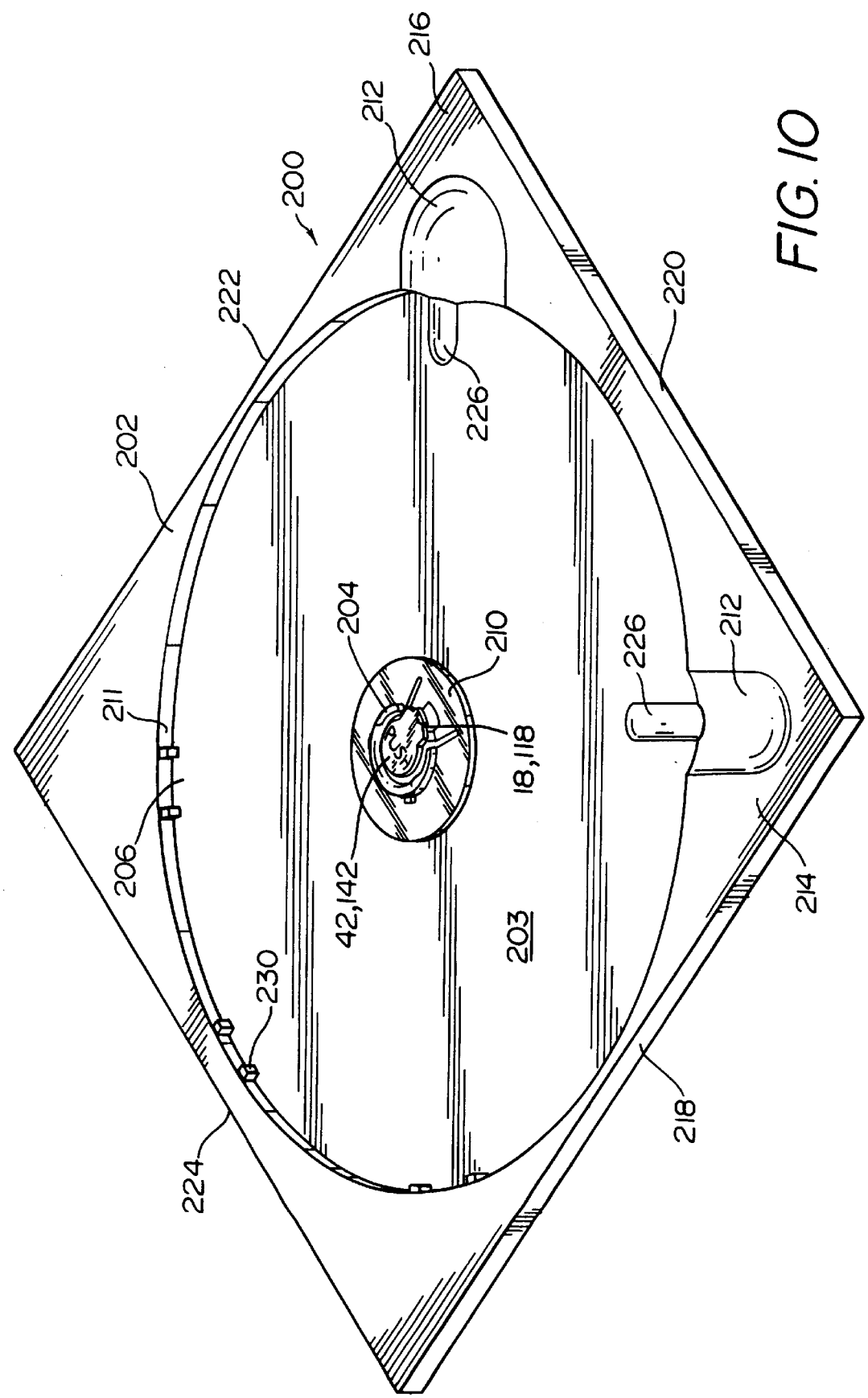
FIG. 10 is a perspective view of an improved tray including the improved rosette of the present invention.
Figure 11:
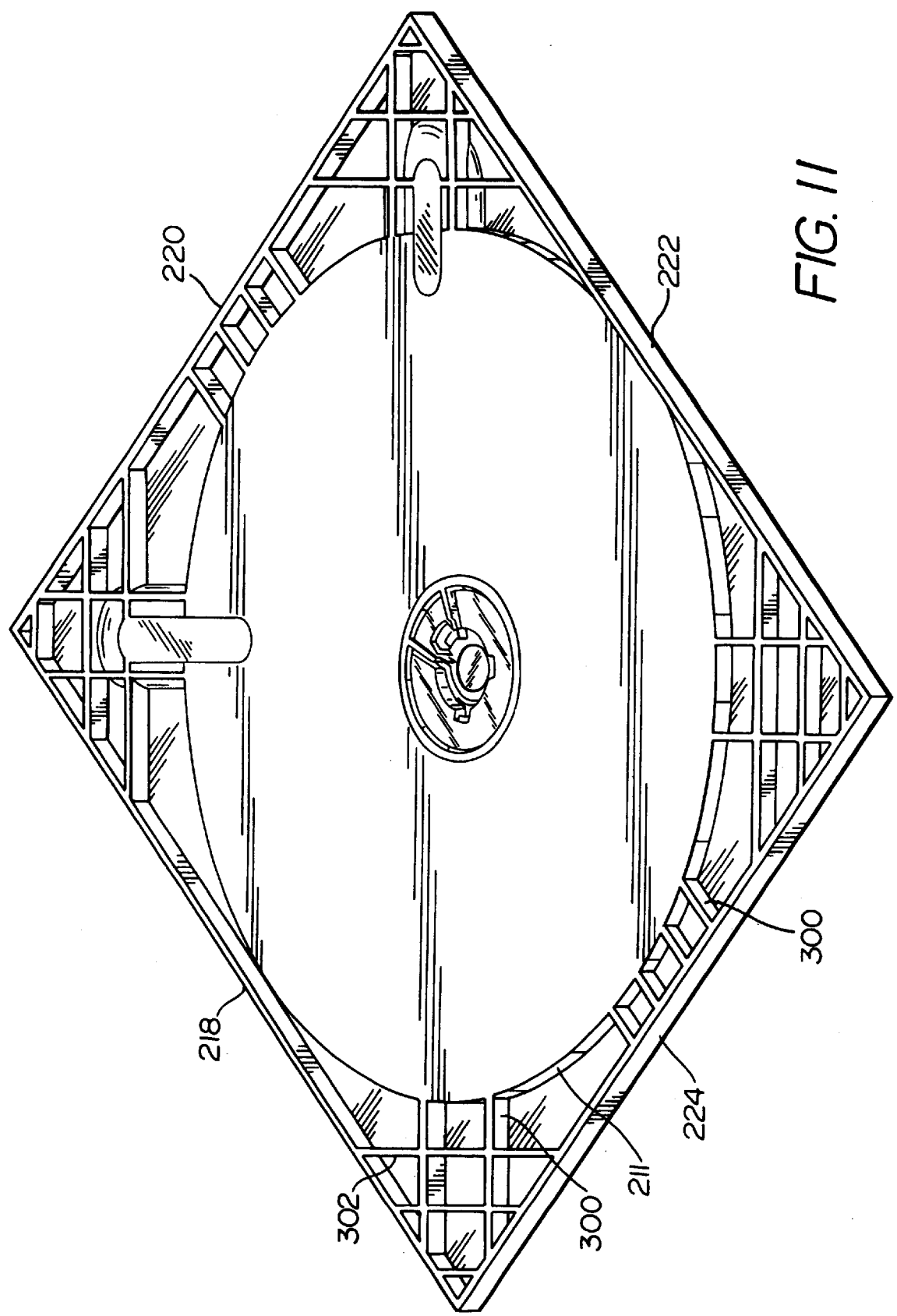
FIG. 11 is a perspective view of the underside of the improved tray of FIG. 10.

With reference to FIGS. 10 and 11, a CD tray 202 including a rosette 204 in accordance with the present invention is illustrated at 200. Tray 202 typically is molded with four walls 218, 220, 222, 224 and includes a circular depression 206 therein having a shape and size for receiving a disc and including a floor 208 above which the disc is supported on raised seat 210 and a vertical, circular depression wall 211. A fingerwell 212 opening into the circular depression 206 is formed in one or both of the generally triangular tray upper surfaces 214, 216 defined between the tray walls 218, 220 and 220, 222 and the circular depression 206 along the arc length thereof which is rearward of the tab 42, 142 on rosette 204. By rearward of the tab 42, 142 it is meant that fingerwells 212 are positioned along that portion of the arc of the circular depression wall 211 which is generally opposite second annular section 18, 118. Stated otherwise, rearward of the tab 42, 142 means that fingerwells 212 are positioned along that portion of the arc of the circular depression wall 211 which is within the tray portion which includes second annular section 18, 118, the tray portion being defined by an imaginary line (not shown) which is parallel (in FIG. 10) to wall 220 and passing through the free end 40, 140 of tab 42, 142. As can be seen most clearly in FIG. 10, fingerwells 212 are positioned in each of triangular surfaces 214, 216. It is particularly desirable for each fingerwell to include an elongate depression 226 in each fingerwell 212 and in the adjacent floor 208 to allow the tip of a finger within fingerwell 212 to be placed in depression 226 to facilitate the fingertip reaching under the perimetric edge of a disc seated on raised seat 210. Tray 202 is characterized by omitting fingerwells along the portion of the arc of the circular depression which is forward of tab 42, 142. The reason for this is to prevent breakage of the disc when attempting to remove it from the rosette. Typically, as tab 42, 142 is depressed with one finger, another finger is placed within a fingerwell to grasp the edge of the disc to lift the edge as the center of the disc is released from the rosette. This facilitates safe disc removal. However, it has been found that, frequently, the downward pressure on tab 42, 142 is inadvertently released while the finger grasping the disc edge continues to lift the disc edge upwardly, with the result that the upward force on the outer edge of the disc while the center of the disk is not released from the rosette causes the disk to break or become bent or otherwise distorted. It has been observed that one is much less likely to pull upwardly on the disk edge without releasing the disk center from the rosette when the disk edge which is grasped is rearward of the press tab. As a result, the configuration of tray 202 is designed to prevent damage to the disc when the disc is being removed from a rosette of the present invention.

When a tray is jarred along its sides or at its corners, for example, when it is dropped on an edge, the impact tends to move the tray wall and the circular depression wall 211 inwardly until the circular depression wall 211 moves a sufficient distance to close the gap between it and the outer perimetric edge of the disc, at which point the circular depression wall 211 impacts or punches the edge of the disc. As a result of the force of the punch, the disc, in turn, moves inwardly until the perimetric edge of its central opening impacts on the cylindrical wall of the rosette with the frequent result that the rosette is damaged. The design of the rosette and tray of the present invention is intended to minimize the susceptibility of the rosette to breakage as a result of such impact. In this connection it has been found useful to position a plurality of radially inwardly and circumferentially extending spacer means 230 along circular depression wall 211 within circumferential recess 206. Each of the spacer means 230 may be in the nature of ribs and extend circumferentially only a very short distance, e.g., 0.040 inches, or may be in the nature of pads and extend circumferentially a considerably greater distance, e.g., .375 inches or more. For ease of molding the spacer means 230 generally extend from floor 208 the full height of circular depression wall 211. The purpose of spacer means 230 is to decrease the gap between circular recession wall 211 and the outer perimetric edge of the disc so that when a tray is jarred along its sides or at its corners, the contact of the depression wall 211 with the outer perimetric edge of the disc is in the form of a push rather than a punch. This, in combination with providing a small space between the rosette walls and the perimetric edge of the disc opening, significantly reduces the likelihood of rosette breakage resulting from a jarring of the tray. To accomplish this purpose, spacer means 230 are desirably positioned at spaced locations around the circular recession wall 211. However, similar results can be achieved by more localized positioning of spacer means 230, e.g., along the portion of the arc of circular depression wall 211 which is forward of tab 42, 142, such as on the circular depression wall 211 opposite the tray corners defined by the intersection of walls 218,224 and 222,224 and along wall 224.

However, it also has been found to be useful to inhibit the transmission of impact from the walls of the tray to the disc by providing reinforcing ribs between the walls of the tray and the wall of the circular depression. As can be seen most clearly in FIG. 11, the use of one or more generally radially directed or inwardly directed ribs 300 between the tray walls and the circular depression wall 211 along the underside of each of the generally triangular areas defined between the tray wall corners and the circular depression wall 211 and in the space between the central portions of the tray walls and the circular depression wall 211. Additional strength can be obtained by providing cross ribs 302 along the underside of the tray, particularly in the corners of the tray between intersecting tray walls.

While the present invention has been described in terms of specific embodiments thereof, it will be understood that no limitations are intended to the details of construction or design other than as defined in the appended claims.

What is claimed is:

1. A disc retaining member for securing a disc shaped element having a central aperture, said member comprising:
   a) a raised circular hub having a substantially cylindrical side wall, said hub projecting upward from a planar base and having a central axis extending generally parallel to said cylindrical side wall;
   b) said hub comprising first and second upstanding annular sections having, respectively, first and second side walls, said first annular section comprising at least 180° of the circumferential extent of said circular hub and said second annular section comprising substantially the remainder of the 360° circumferential extent of said hub;
   c) each of said annular sections including at least one radially extending rim projecting outwardly beyond the outside diameter of said annular section side walls;
   d) means for supporting said second annular section on said base to allow said second annular section to pivot radially inwardly and downwardly and to resiliently return to its unpivoted position;
   e) tab means cantilevered from said second annular section above said base, said tab means extending radially inwardly toward said central axis;
   f) wherein a disc shaped element mounted on said disc retaining member may be one-handedly removed therefrom by the application of finger pressure to said tab means in a direction causing the free end of said tab means to move downwardly toward said base, the movement of said tab means causing said second annular section to pivot radially inwardly and downwardly, allowing the disc central aperture to slide upwardly over said radially extending rims, whereby the disc shaped element is released from engagement with said radially extending rims.

2. A disc retaining member, as claimed in claim 1, wherein said first annular section includes two circumferentially spaced apart rims projecting therefrom.

3. A disc retaining member, as claimed in claim 1, wherein said first annular section comprises from 180° to 315° of the circumferential extent of said circular hub.

4. A disc retaining member, as claimed in claim 1, including at least two elongate slits formed in said base between said first and second annular sections and extending generally radially outwardly therefrom for allowing pivotal movement of said second annular section.

5. A disc retaining member, as claimed in claim 4, wherein two elongate slits are formed in said base, said slits extending generally radially outwardly from said second annular section adjacent the ends thereof.

6. A disc retaining member, as claimed in claim 1, wherein said tab means comprises a radially inwardly extending elongate arm cantilevered from said second annular section, said arm including a pressure applying area adjacent the free end thereof.

7. A disc retaining member, as claimed in claim 6, wherein said arm has at least sufficient radial length that the pressure applying area is at least centered upon said central axis.

8. A storage tray for storing and securing a disc shaped element having a central aperture, said tray comprising a substantially planar base having a disc retaining member integral therewith, said member comprising:
   a) a raised circular hub having a substantially cylindrical side wall, said hub projecting upward from said planar base and having a central axis extending generally parallel to said cylindrical side wall;
   b) said hub comprising first and second upstanding annular sections having, respectively, first and second side walls, said first annular section comprising at least 180° of the circumferential extent of said circular hub and said second annular section comprising substantially the remainder of the 360° circumferential extent of said hub;
   c) each of said annular sections including at least one radially extending rim projecting outwardly beyond the outside diameter of said annular section side walls;
   d) means for supporting said second annular section on said base to allow the second annular section to pivot radially inwardly and downwardly and to resiliently return to its unpivoted position;
   e) tab means cantilevered from said second annular section above said base, said tab means extending radially inwardly toward said axis;

f) wherein a disc shaped element mounted on said disc retaining member may be one-handedly removed therefrom by the application of finger pressure to said tab means in a direction causing the free end of said tab means to move downwardly toward said base, the movement of said tab means causing said second annular section to pivot radially inwardly and downwardly, allowing the disc central aperture to slide upwardly over said radially extending rims, whereby the disc shaped element is released from engagement with said radially extending rims.

9. A storage tray, as claimed in claim 8, wherein said first annular section includes two circumferentially spaced apart rims projecting therefrom.

10. A storage tray, as claimed in claim 8, wherein said first annular section comprises from 180° to 315° of the circumferential extent of said circular hub.

11. A storage tray, as claimed in claim 8, including at least two elongate slits formed in said base between said first and second annular sections and extending generally radially outwardly therefrom for allowing pivotal movement of said second annular section.

12. A storage tray, as claimed in claim 11, wherein two elongate slits are formed in said base, said slits extending generally radially outwardly from said second annular section adjacent the ends thereof.

13. A storage tray, as claimed in claim 8, wherein said tab means comprises a radially inwardly extending elongate arm cantilevered from the cylindrical side wall of said second annular section, said arm including a pressure applying area adjacent the free end thereof.

14. A storage tray, as claimed in claim 13, wherein said arm has at least sufficient radial length that the pressure applying area is at least centered upon said central axis.

15. A disc retaining member, as claimed in claim 1, wherein said first and second side walls are substantially cylindrical side walls.

16. A disc retaining member, as claimed in claim 1, wherein said first side wall is generally C-shaped in a plane perpendicular to said central axis and includes reduced vertical height portions at each of its free ends.

17. A disc retaining member, as claimed in claim 16, wherein said first and second side walls are substantially cylindrical side walls and said second annular section is radially offset away from said central axis such that the cylindrical side wall of said second annular section is positioned radially outwardly of the cylindrical side wall of said first annular section.

18. A disc retaining member, as claimed in claim 16, wherein said reduced vertical height portions extend from the free ends of said first side wall up to but not including the portions thereof which include the radially extending rims most closely adjacent said free ends.

19. A disc retaining member, as claimed in claim 1, wherein said side wall of said first annular section is substantially cylindrical and said second annular section comprises an annular top wall and a side wall extending between said top wall and said base, said side wall comprising at least one pair of spaced apart legs.

20. A disc retaining member, as claimed in claim 19, wherein said at least one radially extending rim on said second annular section projects outwardly from said top wall and said tab means is cantilevered from said top wall.

21. A storage tray, as claimed in claim 8, wherein said first and second side walls are substantially cylindrical side walls.

22. A storage tray, as claimed in claim 8, wherein said first side wall is generally C-shaped in a plane perpendicular to said central axis and includes reduced vertical height portions at each of its free ends.

23. A storage tray, as claimed in claim 22, wherein said first and second side walls are substantially cylindrical side walls and said second annular section is radially offset away from said central axis such that the cylindrical side wall of said second annular section is positioned radially outwardly of the cylindrical side wall of said first annular section.

24. A storage tray, as claimed in claim 22, wherein said reduced vertical height portions extend from the free ends of said first side wall up to but not including the portions thereof which include the radially extending rims most closely adjacent said free ends.

25. A storage tray, as claimed in claim 8, wherein said side wall of said first annular section is substantially cylindrical and said second annular section comprises an annular top wall and a side wall extending between said top wall and said base, said side wall comprising at least one pair of spaced apart legs.

26. A storage tray, as claimed in claim 25, wherein said at least one radially extending rim on said second annular section projects outwardly from said top wall and said tab means is cantilevered from said top wall.

27. A storage tray, as claimed in claim 8, further including at least one fingerwell in said base positioned along the arc length of the perimetric outer edge of said disc shaped element which is rearward of said tab means.

28. A storage tray, as claimed in claim 8, including a circular depression in said base having a size appropriate for closely receiving said disc shaped element therein and a floor of said depression above which said disc shaped element is supported on said raised circular hub, said circular depression defining with said raised portion of said base a vertical circumferential wall surrounding said depression, said vertical circumferential wall positioned closely adjacent the outer perimetric edge of said disc shaped element.

29. A storage tray, as claimed in claim 28, further including a plurality of circumferentially extending spacer means circumferentially spaced apart along and extending radially inwardly from said vertical circumferential wall within said depression for reducing the gap between the outer perimetric edge of said disc shaped element and said vertical circumferential wall.

30. A storage tray, as claimed in claim 28, further including at least one fingerwell in the raised portion of said base communicating with said depression and positioned along the arc length of said vertical circumferential wall which is rearward of said tab means.

31. A storage tray, as claimed in claim 30, further including an elongate depression in each fingerwell and the adjacent floor of said base.

32. A storage tray, as claimed in claim 28, wherein said base includes depending side walls and includes rib means extending between said depending side walls and the vertical circumferential wall along the side of said base opposite the side on which said circular hub is mounted.

* * * * *